Nov. 12, 1940.  B. H. SMITH  2,221,494
SPRAYING MACHINE
Filed April 26, 1938  3 Sheets-Sheet 1
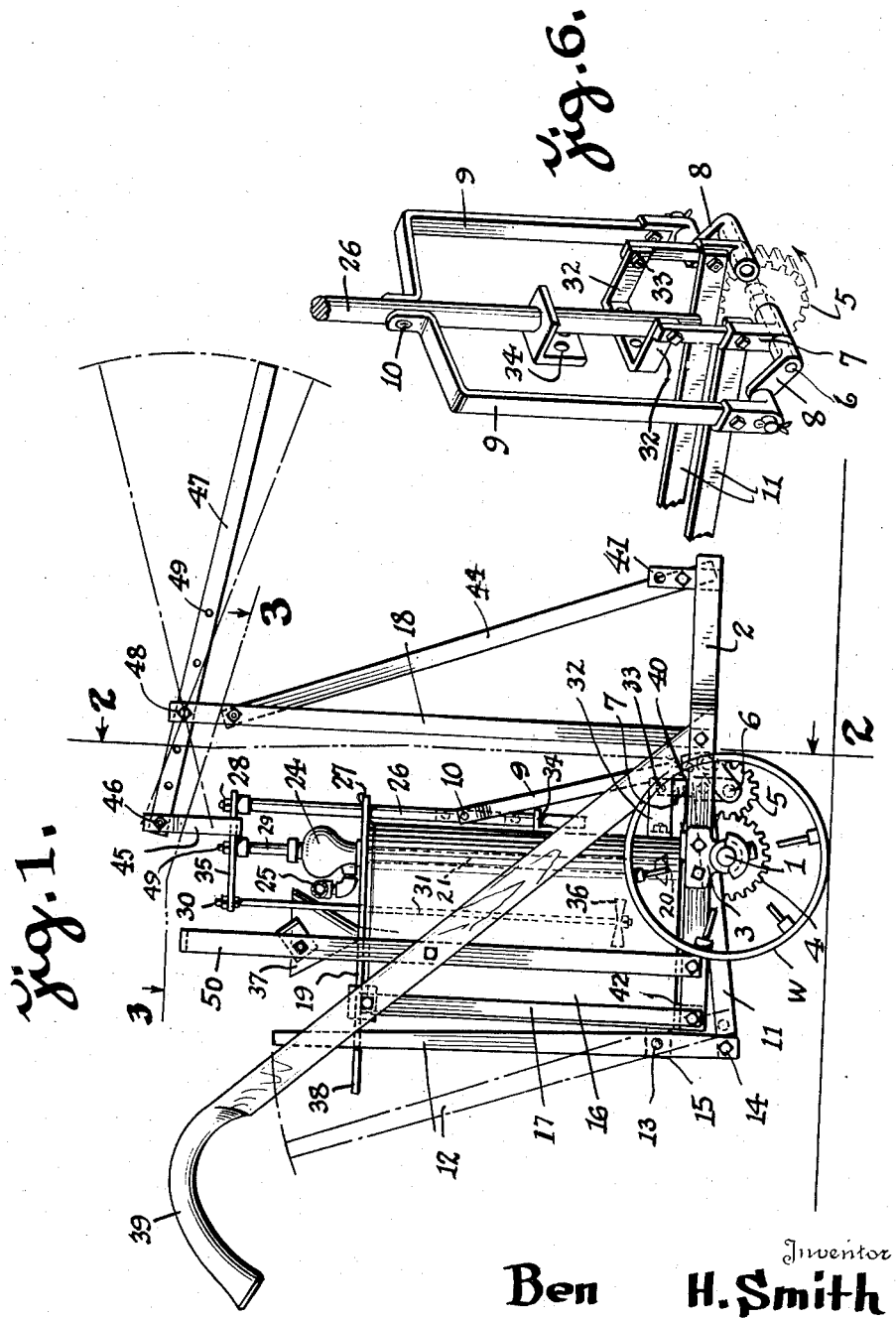
Inventor
Ben H. Smith
By Lester L. Sargent
Attorney

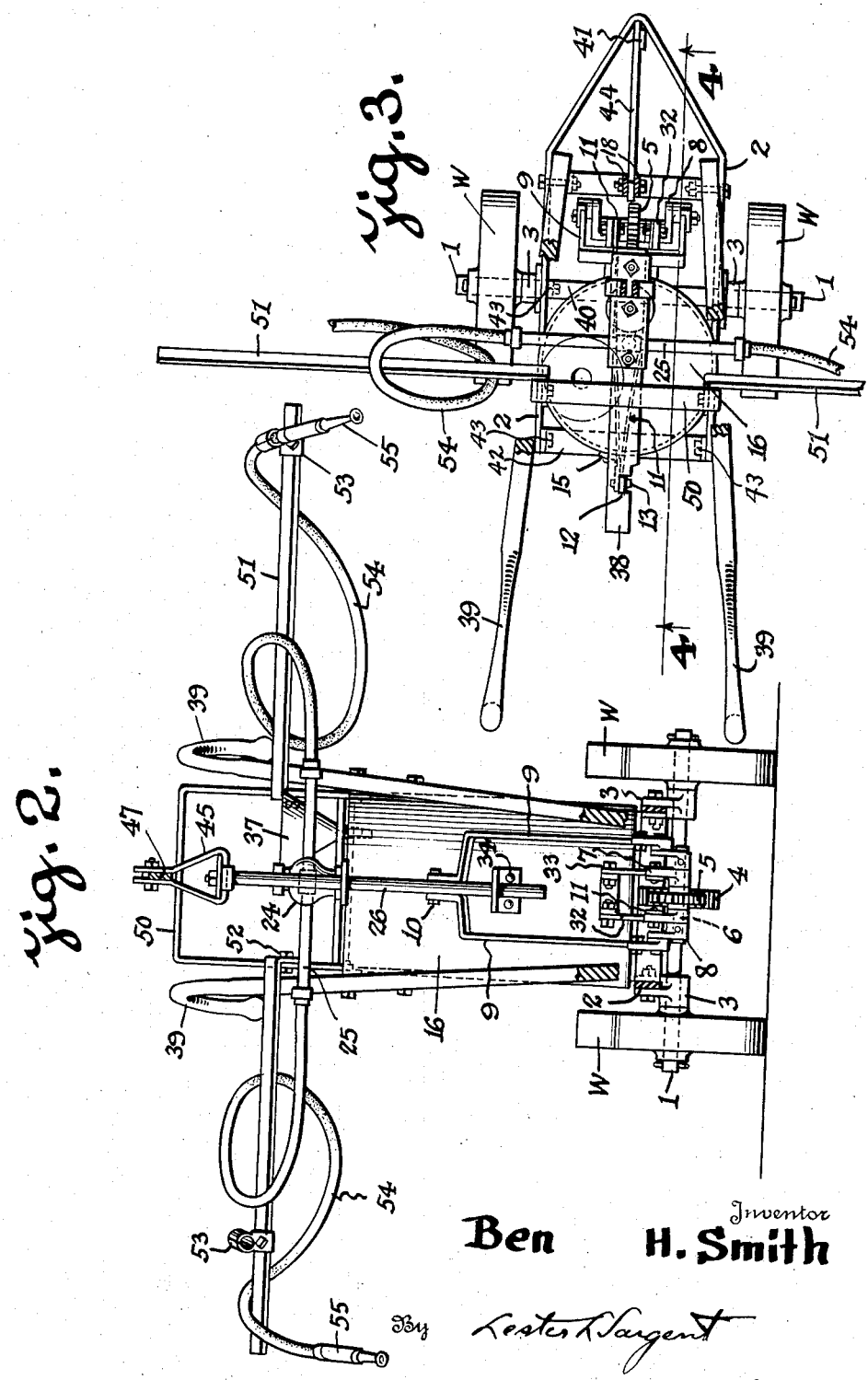

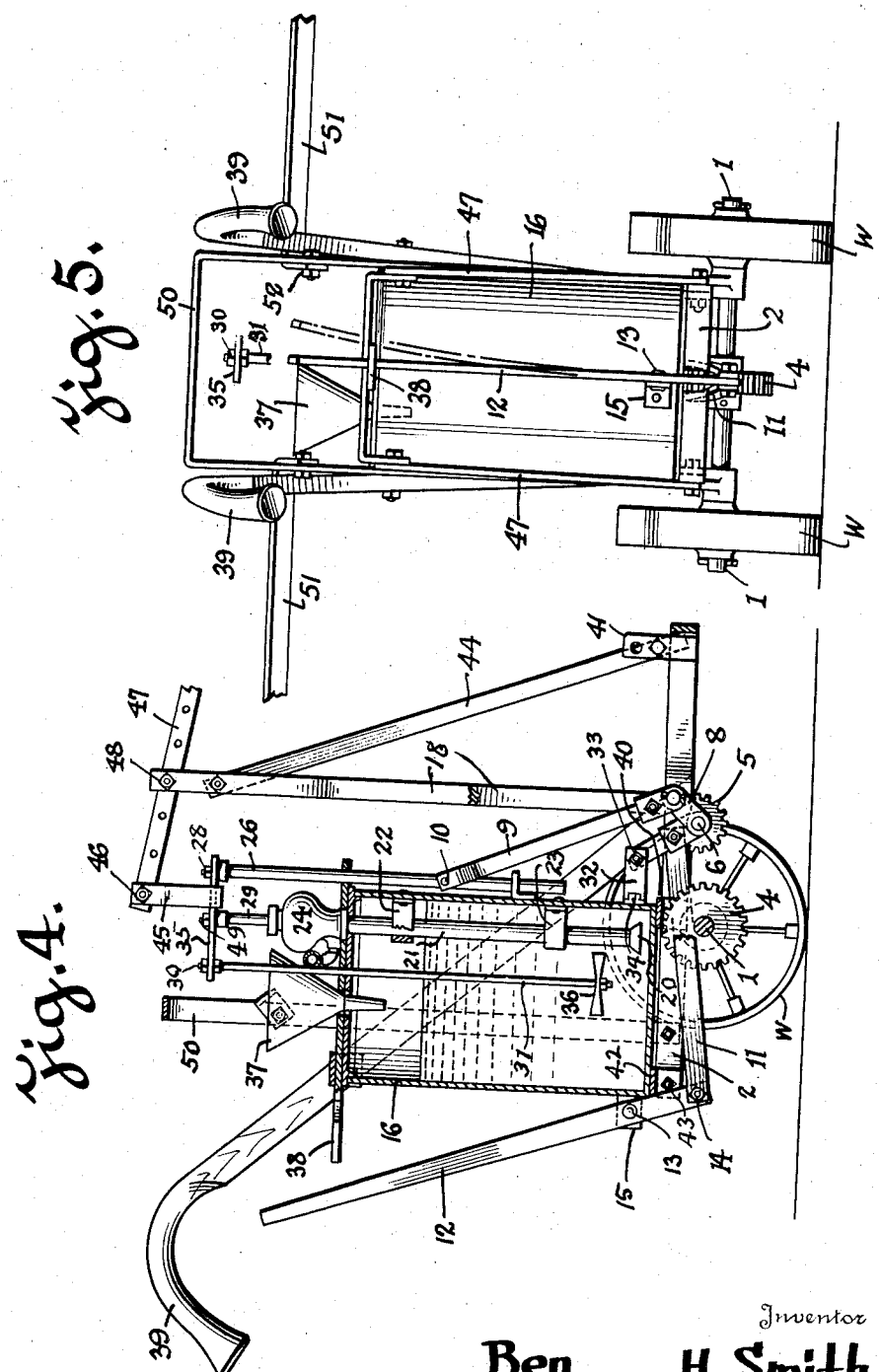

Patented Nov. 12, 1940

2,221,494

UNITED STATES PATENT OFFICE 2,221,494

SPRAYING MACHINE

Ben H. Smith, Statesboro, Ga.

Application April 26, 1938, Serial No. 204,426

8 Claims. (Cl. 299—41)

The object of my invention is to provide a novel spraying machine which is capable of automatic self operation as it is wheeled along between rows of plants, or it can be manually operated while it is stationary; and to provide the novel combination of and arrangement of parts disclosed in the accompanying drawings and hereinafter described.

I attain these and other objects of my invention by the mechanism illustrated in the accompanying drawings, in which—

Figure 1 is a side elevation of the invention;

Fig. 2 is a vertical section on line 2—2 of Fig. 1 showing a view of most of the front of the machine;

Fig. 3 is a horizontal section on line 3—3 of Fig. 1 showing a top plan view of most of the machine;

Fig. 4 is a vertical section through the center of the machine;

Fig. 5 is a rear plan view of the machine, a portion of member 51 being broken away for lack of space; and Fig. 6 is a detailed perspective view of the pump drive shaft operating mechanism.

Like numerals designate like parts in each of the several views;

Referring to the accompanying drawings, I provide wheels w mounted on the main axle 1 carried by the axle support 3 secured to horizontal beams 2. Mounted on main axle 1 is a driving gear 4. I provide a driven gear 5 affixed to the short axle 6, said axle being loosely mounted on the axle supports 7 which are pivotally mounted at 33 on bracket arms 32, as shown in Fig. 1. The ends of axle 6 projecting beyond axle supports 7 are affixed to the cranks 8 which are operatively connected to the lower ends of the driving arms 9, which arms in turn are pivotally attached at 10 to the drive shaft 26, as shown in Fig. 6.

Bars 11 are pivotally attached at their forward ends to the axle support 7, as shown in Fig. 6, and pivotally attached at their rear ends at 14, as shown in Fig. 1 to the manually operated lever 12. Lever 12 is pivotally mounted at 13 on a suitable lever support 15, as shown in Figs. 1 and 4.

As shown in Fig. 1, an insecticide tank 16 is mounted between a back frame 17, front frame 17 and a front frame member 18 with a clamp 19 extending over the top of the tank and functioning as a support or guide for pump shaft 26. As shown in Fig. 4, I provide spaced pump clamps 22 and 23 engaging the conduit 21 leading to double-action pump 24. The intake mouth 20 of intake conduit 21 is positioned close to the bottom of tank 16.

Opening out of the pump 24 are opposite laterally extending discharge pipes 25 to which are attached hose 54 terminating in nozzles 55. The hose 54 is supported on lateral arms 51 which carry brackets or clamp rings 53 for holding nozzles 55, as shown in Fig. 2. The pump shaft 26 reciprocates vertically through the guide slot 27 in member 19, as shown in Fig. 1 and is secured by suitable connection 28 to bar 35, which bar in turn is secured to the shaft 29 of the pump; also by connection 30 to the agitator rod 31 which at its lower end carries the agitator blades 36.

As shown in Fig. 6, the bracket 32 is attached to the tank or other suitable support and at 33 is pivotally connected to the axle support 7 carrying the axle of gear 5. I provide a slotted guide clamp 34 in which drive shaft 26 is slidable, as shown in Figs. 1 and 6. A suitable funnel 37 provides a means for filling the tank 16 with insecticide. A suitable lever fastener 38 which may be an extension of bar 19 and preferably pivotally swingable, releasably engages lever 12 to retain it in position to hold gear 5, which it controls, in meshing engagement with driving gear 4. The machine is pushed along and guided by means of handle bars 39.

The cross arms 40 and 42, shown in Figs. 1 and 3, support tank 16 and also being bolted to beams 2 by bolts or rivets 43, hold them in fixed spaced relation. At the front of the machine a singletree hitch 41 is provided for use when the device is to be drawn by a horse. The diagonally disposed brace rod 44 is fastened at its lower end to singletree 41 and its upper end to front frame members 18.

When the device is standing still, the pump may be operated by the manual operating lever 47 which is pivotally mounted at 48 on front frame members 18 and which is pivotally connected at 46 to a link 45. To pump manually when standing still, the operator preferably disconnects driving arms 9 and 10 from driving shaft 26 and connects manually operated lever 47 at 46 to link 45. This is equivalent to putting the machine out of mesh in gear wheels 4 and 5, shown in Fig. 4, as lever 47 and driving arms 9 preferably are not both connected at the same time.

Link 45 is attached to bar 35, which in turn is affixed at 49 to the pump shaft 29, as shown in Figs. 1 and 4. The frame 50, as shown in Figs. 2 and 5 provides a support for the laterally extending arms 51 on which the opposite extending hose 54 are mounted, as hereinbefore described, and as shown in Fig. 2.

In use the machine may be pushed along and guided by the handle bars 39, or may be horse-drawn from singletree 41. While thus operated, the lever 12 is fastened by member 38 in the position shown in solid lines in Fig. 1, with the gear 5 meshing with the driving gear 4, thereby operating the cranks 8 which are affixed to axle 6 of gear 5 and reciprocating driving arms 9 and driven shaft 26 to which they are pivotally connected at their upper ends. The shaft 26 in turn actuating bar 35 and shaft 29 to pump the insecticide through conduit 21 to the laterally extending pipes 25 and hose 54 for discharge through nozzles 55 which are supported on arms 51, the nozzles 55 being laterally adjustable on arms 51 by means of the laterally adjustable hose supporting clamps 53, as shown in Fig. 2.

To throw the gears 5 and 4 out of mesh, the lever 12 is shifted to the position shown in dotted lines in Fig. 1. When the mechanism is in this relation, as shown in solid lines in Fig. 4, the machine, while stationary, may be operated by manually operating lever 47, which through link 45 operates bar 35 and pump shaft 29 to discharge the insecticide through the respective pipes 25 and lines of hose 54.

Bar 35 besides being attached to pump drive shaft 26 and pump shaft 29 is also attached to the agitator rod 31 which carries freely rotatable agitator blades 36 on the lower end of the rod and which serve to stir up the insecticide liquid in tank 16.

Whenever the pump is operated, whether this operation be automatically by the movement of the machine when gears 4 and 5 are in mesh or whether it be by manual operation of lever 47 when the machine is standing still and the pump is being operated by means of lever 47, as hereinbefore described, the liquid in tank 16 is pumped through pipes 25, hose 54 and nozzles 55. For hand pumping, however, it is preferable to remove both nozzles and connect a long hose extension rod, for tobacco bed spraying or for trees. If the machine is being used where the hand pump mechanism is not required it may be disconnected and removed from the machine readily. The tank is filled through funnel 37.

The hose supporting arms 51 are adjustably mounted on the vertical portions of frame member 50 and may be raised or lowered to suit conditions where the spraying is being done.

The V-shaped horizontal beam member 2 at the front of the machine serves to push plants back to their rows while the machine is traveling between rows, without stopping the machine.

It will be noted that there is a direct vertical lift on pump shaft 29, and a direct vertical movement of pump driving shaft 26, which is vertically slidable, or reciprocatory.

What I claim is:

1. In a spraying machine, the combination of a wheeled frame, a tank secured to the frame, handle bars for pushing the machine along, laterally extending fixed elevated horizontal bars secured to the framework surrounding the tank, a pump having an intake pipe extending to a point near the bottom of the tank, and having a pump driving shaft, a pump shaft, discharge pipes opening out of the pump, hose connected to said pipes and carrying nozzles and mounted on the laterally extending bars, laterally adjustable clamps on said bars for laterally adjusting the aforesaid hose and nozzles, an agitator device extending into the tank, a bar with which said agitator device and pump shaft and pump driving shaft are directly connected, and a pivotally mounted lever disposed above said bar and having its end linked thereto to permit of manual operation of the pump while the machine is in a stationary position.

2. In a spraying machine, the combination of a wheeled frame, a tank secured to the frame, handle bars for pushing the machine along, fixed opposite horizontal laterally extending bars secured to framework surrounding the tank, a pump having an intake pipe extending to a point near the bottom of the tank, and having a pump having shaft, a pump shaft, discharge pipes opening out of the pump, hose connected to said pipes and carrying nozzles and mounted on the laterally extending bars, laterally adjustable clamps on said bars for laterally adjusting the aforesaid hose and nozzles, an agitator device extending into the tank, a bar with which said agitator device and pump shaft and pump driving shaft are directly connected, a driving gear mounted on the main axle of the machine, a driven gear adapted to mesh with said driving gear, and manually operated means for throwing the said driven gears in or out of mesh with the driving gear, and crank operating mechanism operatively connecting the aforesaid driven gear with the pump driving shaft.

3. In a spraying machine, the combination of a wheeled frame, a tank secured to the frame, handle bars for pushing the machine along, a pump having an intake pipe extending to a point near the bottom of the tank, and having a pump driving shaft, a pump shaft, discharge pipes opening out of the pump, hose connected to said pipes and carrying nozzles, an agitator device extending into the tank, a bar with which said agitator device and pump shaft and pump driving shaft are directly connected, and a pivotally mounted lever disposed above said bar and having its end linked thereto to permit of manual operation of the pump while the machine is in a stationary position.

4. In a spraying machine, the combination of a wheeled frame, a tank secured to the frame, handle bars for pushing the machine along, horizontal laterally extending bars secured to the framework surrounding the tank, a pump having an intake pipe extending to a point near the bottom of the tank, and having a pump driving shaft, a pump shaft, discharge pipes opening out of the pump, hose connected to said pipes and carrying nozzles and mounted on the laterally extending bars, laterally adjustable clamps on said bars for laterally adjusting the aforesaid hose and nozzles, an agitator device extending into the tank and having agitator blades, a bar with which said agitator device and pump shaft and pump driving shaft are directly connected, a driving gear mounted on the main axle of the machine, a driven gear adapted to mesh with said driving gear, and crank operating mechanism operatively connecting the aforesaid driven gear with the pump driving shaft.

5. In a spraying machine, the combination of a wheeled frame, a tank secured to the frame, a pump having an intake pipe, and having a pump shaft, discharge pipes opening out of the pump, hose connected to said pipes and carrying nozzles, an agitator device extending into the tank and having agitator blades, a bar with which said agitator device and pump shaft and pump driving shaft are directly connected, a driving gear mounted on the main axle of the machine, a driven gear adapted to mesh with said driving gear, manually operated means for throwing the said driven gears in or out of mesh with the driving gear, and crank operating mechanism operatively connecting the aforesaid driven gear with the pump driving shaft.

6. In a spraying machine, the combination of a wheeled frame, a tank secured to said frame, handle bars for pushing the machine along, fixed horizontal laterally extending bars secured to the upper end of the framework surrounding the tank, a pump having an intake pipe extending to a point near the bottom of the tank, and having a pump driving shaft, a pump shaft, discharge pipes opening out of the pump, hose connected to said pipes and carrying nozzles and mounted on the aforesaid laterally extending bars, laterally adjustable clamps on said bars for laterally adjusting the aforesaid hose and nozzles, an agitator device extending into the tank, a bar with which said agitator device and pump shaft and pump driving shaft are directly connected, means for vertically guiding the pump driving shaft, a pivotally mounted lever disposed above said bar and having its end linked thereto to permit of manual operation of the pump while the machine is in a stationary position.

7. In a spraying machine, the combination of a wheeled frame, a tank secured to the frame, handle bars for pushing the machine along, laterally extending bars secured to the upper end of the framework surrounding the tank, a pump having an intake pipe extending to a point near the bottom of the tank, and having a pump driving shaft, a pump shaft, discharge pipes opening out of the pump, hose connected to said pipes and carrying nozzles and mounted on the laterally extending bars laterally adjustable clamps on said bars for laterally adjusting the aforesaid hose and nozzles, an agitator device extending into the tank and having agitator blades, a bar with which said agitator device and pump shaft and pump driving shaft are directly connected, a driving gear mounted on the main axle of the machine, a driven gear adapted to mesh with said driving gear, manually operated means disposed at the rear of the tank and adjacent the upper portion of the handle bars for throwing the said driven gears in or out of mesh with the driving gear, and crank operating mechanism operatively connecting the aforesaid driven gear with the pump driving shaft.

8. In a spraying machine, the combination of a wheeled frame, a tank secured to the frame and surrounded by framework, handle bars for pushing the machine along, laterally extending bars secured to the upper end of the framework surrounding the tank, a pump having an intake pipe extending to a point near the bottom of the tank, and having a pump driving shaft, a pump shaft, discharge pipes opening out of the pump, hose connected to said pipes and carrying nozzles and mounted on the laterally extending bars, laterally adjustable clamps on said bars for laterally adjusting the aforesaid hose and nozzles, an agitator device extending into the tank and having agitator blades, a bar with which said agitator device and pump shaft and pump driving shaft are directly connected, and means for throwing the pump into or out of operation by the wheeled frame when in motion.

BEN H. SMITH.